(12) United States Patent
Moughelbay et al.

(10) Patent No.: US 7,543,359 B2
(45) Date of Patent: Jun. 9, 2009

(54) TYING DEVICE

(75) Inventors: Rabih Moughelbay, Fulham (AU); Sergio Daniel Diaz, Parafield Gardens (AU)

(73) Assignee: Kableflags Pty. Ltd., Unley SA (AU)

( * ) Notice: Subject to any disclaimer, the term of this patent is extended or adjusted under 35 U.S.C. 154(b) by 0 days.

(21) Appl. No.: 10/516,471

(22) PCT Filed: May 30, 2003

(86) PCT No.: PCT/AU03/00665

§ 371 (c)(1),
(2), (4) Date: Nov. 29, 2004

(87) PCT Pub. No.: WO03/102443

PCT Pub. Date: Dec. 11, 2003

(65) Prior Publication Data

US 2005/0268435 A1    Dec. 8, 2005

(30) Foreign Application Priority Data

May 30, 2002 (AU) .................. PS2636
Jan. 29, 2003 (AU) .................. 2003900461

(51) Int. Cl.
    *B65D 63/00* (2006.01)
(52) U.S. Cl. .................. 24/16 PB; 40/662; 40/665
(58) Field of Classification Search ............. 24/16 PB, 24/128 R, 129 R, 128, 138; 206/343
    See application file for complete search history.

(56) References Cited

U.S. PATENT DOCUMENTS

| 1,945,932 | A | * | 2/1934 | Caley | 24/16 PB |
| 2,554,105 | A | * | 5/1951 | Heinle | 40/662 |
| 3,050,578 | A | | 8/1962 | Huebner et al. | |
| 3,147,522 | A | * | 9/1964 | Schumm | 24/16 PB |
| 3,169,004 | A | * | 2/1965 | Rapata | 248/71 |
| 4,268,986 | A | | 5/1981 | Piana | |
| 4,470,174 | A | * | 9/1984 | Rhea | 24/68 E |
| 4,477,950 | A | * | 10/1984 | Cisek et al. | 24/16 PB |

(Continued)

FOREIGN PATENT DOCUMENTS

AU    35196/68    9/1969

(Continued)

OTHER PUBLICATIONS

A webpage of NELCO Products, Inc. website as existed in 2000, under the Specialty Cable Ties Section of the webpage.

*Primary Examiner*—Robert J Sandy
(74) *Attorney, Agent, or Firm*—Ladas & Parry LLP

(57) ABSTRACT

A system is shown for differentiating two or more cables of two or more respective appliances. The system comprises respective means in the form of tag devices for positioning on and labelling each cable, wherein each tag device is provided in a differentiated form from each other tag device. The tag devices can be pre-printed or supplied with suitable indicia for positioning thereon. Such a system for identification can allow a user to more readily identify the appliance to which the cable is connected, or in the case of use of the system for labelling and identifying containers, to identify a container and its contents. This can be useful in situations where a plurality of cables, or containers, are located in close proximity to one another.

5 Claims, 4 Drawing Sheets

U.S. PATENT DOCUMENTS

| | | | |
|---|---|---|---|
| 4,579,759 A | | 4/1986 | Breuers |
| 4,899,474 A | | 2/1990 | Piana et al. |
| 4,947,568 A | | 8/1990 | De Barbieri |
| 4,991,265 A | * | 2/1991 | Campbell et al. ......... 24/16 PB |
| 5,042,181 A | | 8/1991 | Fortsch |
| 5,133,671 A | * | 7/1992 | Boghosian ................ 24/16 PB |
| 5,193,250 A | | 3/1993 | Caveney |
| 5,586,353 A | * | 12/1996 | Merser ................... 12/142 LC |
| D382,431 S | * | 8/1997 | Parra ........................... D6/546 |
| 5,832,568 A | * | 11/1998 | Higuchi ................... 24/30.5 R |
| 5,911,368 A | | 6/1999 | Davignon |
| 5,967,316 A | * | 10/1999 | Abbruzzese et al. ........ 206/343 |
| 6,044,525 A | * | 4/2000 | Sastre et al. ................. 24/20 R |
| 6,116,653 A | | 9/2000 | Oberholzer |
| 6,276,029 B1 | * | 8/2001 | Buettell ................... 24/16 PB |
| 6,305,329 B1 | | 10/2001 | Levy, Jr. |
| 6,497,063 B1 | | 12/2002 | Stephens |
| 6,651,362 B2 | | 11/2003 | Caveney |
| D488,374 S | * | 4/2004 | Hussaini et al. .............. D8/396 |
| 6,962,014 B2 | * | 11/2005 | McCabe et al. ........... 24/16 PB |
| 2004/0006852 A1 | * | 1/2004 | Castro ..................... 24/30.5 R |

FOREIGN PATENT DOCUMENTS

| | | | |
|---|---|---|---|
| AU | 35196/68 A | | 9/1969 |
| GB | 1527263 | | 10/1978 |
| GB | 1527263 A | * | 10/1978 |
| WO | WO 00/34144 A | | 6/2000 |
| WO | WO0034144 | | 6/2000 |

\* cited by examiner

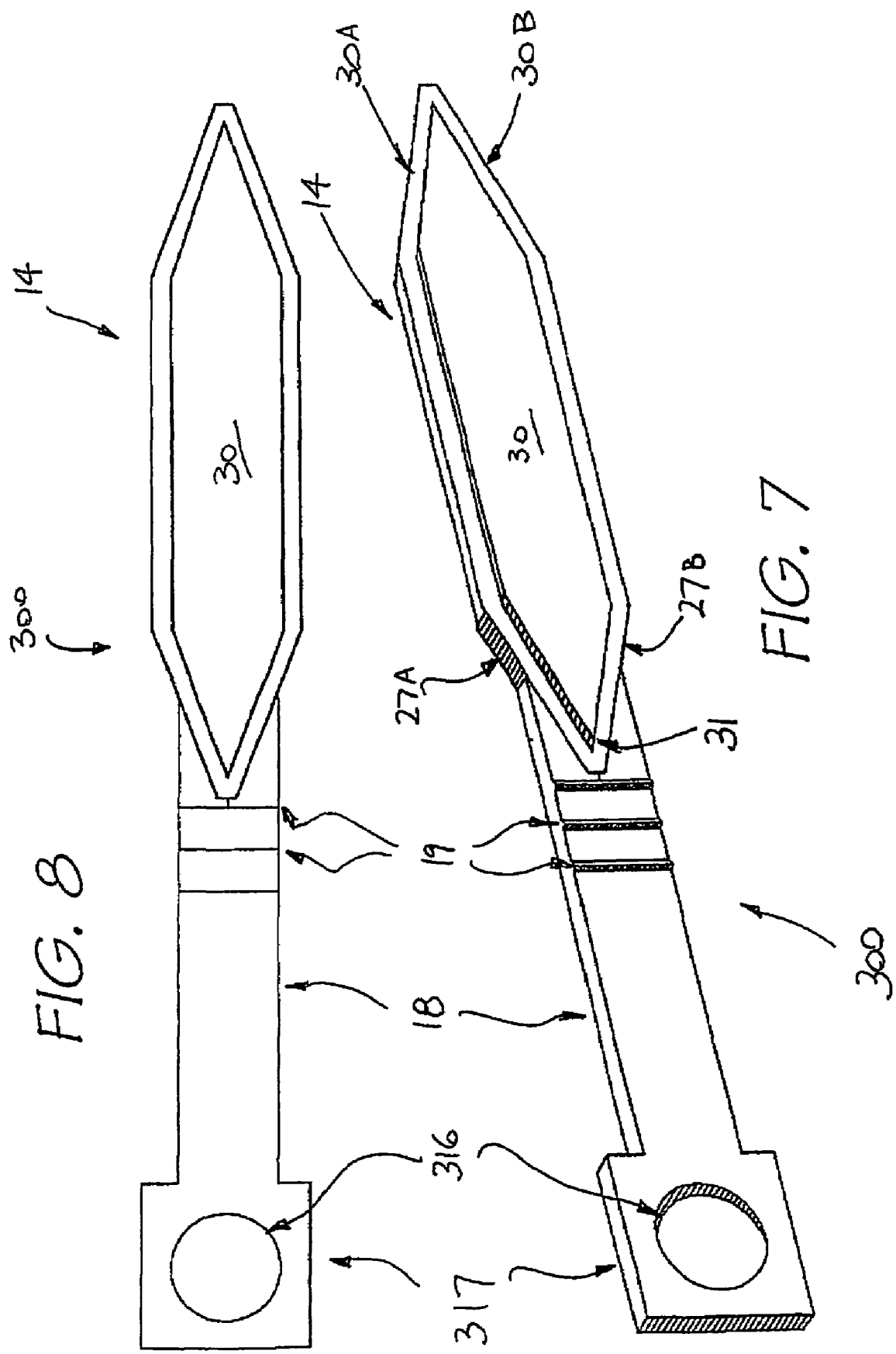

TYING DEVICE

This application is a U.S. National Phase of International Patent Application Ser. No. PCT/AU03/00665, filed May 30, 2003 which claims priority of Australian Patent Application No. PS 2636, filed May 30, 2002 and Australian Patent Application No. 2003900461, filed Jan. 29, 2003.

FIELD OF THE INVENTION

The present invention relates to a tying device. In one form the invention relates to a cable tying device for tying to a single cable in a looped manner, or for tying a number of cables together, and will primarily be described with reference to this context. The device can also be used for identification of the cable/s to which it is tied. It is to be understood that the invention has broad use in securing and tying as well as identification applications for all manner of mechanical or automotive apparatus, containers, cables, ropes, hoses, cords and the like.

BACKGROUND ART

Apparatus for tying a cable is known in the art. In particular, with electrical type cabling it is known to use thin plastic cable ties to join cables together or, for example, to secure cables to walls or a framework in a non-releasable manner. Such devices are used in order to protect the cable itself from being pulled, broken etc as well as from representing a trip hazard for workers.

The power cables of loose electrical equipment such as fans, power tools, computers, toasters etc are often most conveniently stored in a rolled up fashion for storage or transport by such cable ties, although these ties are not readily undone when the cabling is needed in use, and normally cannot be re-used when untied.

SUMMARY OF THE INVENTION

In a first aspect the present invention provides a system for differentiating two or more cables of two or more respective appliances, the system comprising a respective tying device for tying to a respective cable, wherein each tying device is provided in a differentiated form from each other tying device.

An advantage of this aspect of the invention is that the system can allow a user to readily identify the appliance to which the cable is connected, or to identify the cable itself. This is particularly useful in situations where a plurality of appliance cables are located in close proximity to one another, for reasons of safety and to facilitate maintenance.

When the term 'appliance' is used it can broadly refer to any electrical device, for example computers, audio and video equipment and the like, as well as to mechanical devices such as fixed apparatus (pipes, tanks, handrails etc) or moving mechanical or automotive apparatus, for example.

When the term 'cable' is used it refers to any type of cable or conduit, such as electrical cables, wires etc, or non-electrical cables such as pipelines and conduits, hydraulic cables etc.

Preferably the tying device is used for identifying a cable of an electrical appliance, the tying device being attachable to the cable and having a preprinted appliance name thereon or positionable thereon.

Preferably the preprinted, or positionable appliance name is located on an external surface of an enlarged portion of the tying device.

Preferably a plurality of the tying devices are supplied as part of a unit and are detachable from the unit for use. Most preferably the unit is a card.

In a first preferred arrangement, each tying device comprises:

an elongate member for releasable securement at a cable by wrapping around the cable; and a planar enlarged portion arranged on the member for insertion through a hole located in the member, the enlarged portion being at least in part of a thickness greater than a narrowest width dimension of the hole, and at least in part of a transverse width greater than a corresponding width dimension of the hole.

When the term 'hole' is used in this or any other aspect herein, it refers to any shape or size of perforation, slit or orifice in the member, the periphery of the hole being entirely surrounded by the material of the member.

When the term 'thickness' is used in this or any other aspect herein in relation to the enlarged portion, it refers to a height or depth dimension of that enlarged portion rather than to any transverse width dimension of the portion.

Preferably the enlarged portion is located at one end of the elongate member. Preferably the hole is located adjacent to an opposite end of the elongate member.

Preferably the enlarged portion defines a shoulder where it joins the elongate member such that, in use, when the enlarged portion has been inserted through the hole, the shoulder is seated at and abuts an edge of the hole to releaseably secure the device at the cable.

Preferably the shoulder is at least partially rounded. In an alternative preferred arrangement, the shoulder is bevelled.

Preferably the width of the hole is equivalent to or greater than the width of the elongate member.

Preferably a remote end of the enlarged portion, is tapered to facilitate insertion thereof into the hole.

Preferably the enlarged portion of the device at least is made of a flexible material. Most preferably the elongate member is a strap.

Preferably indicia are pre-applied to an external surface of the portion which in use can facilitate identification of a cable to which the tying device is releasably secured.

In an alternative preferred arrangement, each tying device comprises:

an elongate member for releasable securement at a cable by wrapping around the cable; and an enlarged portion connected to the elongate member and being insertable through a hole located in the member;

wherein the member has a width less than the enlarged portion at the connection between the member and enlarged portion to define a shoulder at the enlarged portion such that the device widens moving from the member to the enlarged portion at the connection therebetween.

Preferably the tying device is as otherwise defined for the first preferred arrangement.

In a further alternative preferred arrangement, each tying device comprises:

an elongate member for releasable securement at a cable by wrapping around the cable;

a planar, enlarged portion arranged on the member for insertion through a hole located in the member, the enlarged portion including a raised portion thereon to provide that part of the enlarged portion with a thickness greater than a remainder of the enlarged portion;

the device being configured such that the enlarged portion can be passed from one side of the member, completely through the hole, to an opposite side of the member to be secured at the opposite side.

In this arrangement, preferably the enlarged portion has a transverse width which is greater than the transverse width of the elongate member. Preferably the elongate member has the same thickness as the remainder of the planar enlarged portion.

Preferably indicia are pre-applied to an external surface of the raised portion which in use can facilitate identification of a cable to which the tying device is releasably secured. The raised portion can also be formed of a different colour material to further enhance and/or differentiate its appearance.

Preferably the tying device of this preferred arrangement is as otherwise defined for the first preferred arrangement.

In a second aspect the present invention provides a card comprising a plurality of detachable elongate members, each of the members being frangibly joined to the card for detachment therefrom, an enlarged portion being defined in at least one of the members for insertion in use through a hole located in the member, the enlarged portion being as defined in any of the preferred arrangements described for the first aspect.

An advantage of this aspect of the invention is that a plurality of elongate members can be formed at once by being e.g. stamped out of a single card. The elongate members need not be identical but can have different shape and size dimensions determined by the stamping tool used.

When the term 'card' is used in this or any other aspect herein, it refers to any panel or panel-like member from which elongate members can be detached and leave behind a card skeleton, the card being flat in shape and comprising at least a border frame section.

Preferably the enlarged portion has a transverse width greater than the transverse width of an adjacent portion of the elongate member.

Preferably the elongate portion has a transverse width greater than a corresponding transverse width of the hole.

Preferably the members are each made of the same material as the card.

Preferably each member of this aspect is a tying device of the first aspect.

In a third aspect the present invention provides an electrical appliance cable identification tying device for attachment to the cable and having pre-applied indicia indicating the name of the appliance thereon.

An advantage of this aspect of the invention is that, when e.g. wrapped circumferentially about a cable to form a collar, the tying device can allow a user to readily identify the appliance to which the cable is connected, or to identify the cable itself. This is particularly useful in situations where a plurality of appliance cables are located in close proximity to one another.

Preferably the electrical appliance cable identification tying device of this aspect is a tying device as otherwise defined in the first aspect.

In a fourth aspect the present invention provides a tying device comprising:
    an elongate member for releasable securement at a cable by wrapping around the cable; and
    a planar enlarged portion arranged on the member for insertion through a hole located in the member, the enlarged portion being at least in part of a thickness greater than a corresponding thickness dimension of the hole, and at least in part of a transverse width greater than a corresponding width dimension of the hole.

One advantage of a tying device according to the invention is that, when wrapped circumferentially about a cable to form a collar, the device remains secured to itself, but can also be released so that the device can be re-used many times. The device can be used for tying to or together one or a large number of cables of various diameters, for example, by varying the length of the elongate member.

Preferably the portion is arranged for bearing indicia or for being labelled with indicia. Most preferably the indicia is a name capable of being understood by a human user.

Preferably the tying device of this aspect is a tying device of the first aspect.

In a fifth aspect the present invention provides a tying device comprising:
    an elongate member for releasable securement at a cable by wrapping around the cable; and
    an enlarged portion connected to the elongate member and being insertable through a hole located in the member, wherein the member has a width less than the enlarged portion at the connection between the member and enlarged portion to define a shoulder at the enlarged portion such that the device widens moving from the member to the enlarged portion at the connection therebetween.

As for the fourth aspect of the invention, when the tying device is wrapped circumferentially about a cable to form a collar, the device remains secured to itself, because of the interaction of the greater thickness portion with the hole.

Preferably the portion is arranged for bearing indicia or for being labelled with indicia. Most preferably the indicia is a name capable of being understood by a human user.

Preferably the tying device of this aspect is a tying device of the first aspect.

In a sixth aspect the present invention provides a tying device comprising:
    an elongate member for releasable securement at a cable by wrapping around the cable;
    a planar enlarged portion arranged on the member for insertion through a hole located in the member, the enlarged portion including a raised portion thereon to provide that part of the enlarged portion with a thickness greater than a remainder of the enlarged portion;
    the device being configured such that the enlarged portion can be passed from one side of the member, completely through the hole, to an opposite side of the member to be secured at the opposite side.

An advantage of this aspect of the tying device is that the raised part of the enlarged portion can provide greater visual prominence. The thicker enlarged portion is also inherently stiffer than the remainder of the tying device which makes it easier for a user to see any labelling or printing thereon without the enlarged portion bending or curling etc.

Another advantage of this aspect of the tying device is that the device is easier grip with a user's fingers and thus easier to handle and to tie in use.

Preferably the portion is arranged for bearing indicia or for being labelled with indicia. Most preferably the indicia is a name capable of being understood by a human user.

Preferably the tying device of this aspect is a tying device of the first aspect.

In a seventh aspect the present invention provides a system for differentiating two or more containers for containing two or more respective items, the system comprising a respective tying device for labelling each respective container, wherein each tying device is provided in a differentiated form from each other tying device.

An advantage of this aspect of the invention is that the system can allow a user to readily identify the container and its contents. This is particularly useful in situations where a plurality of containers are located in close proximity to one another, for reasons of safety and speed of access to the container contents.

When the term 'container' is used it refers broadly to any type of device for containing a substance, such as a collapsible or rigid bag, box, gas cylinder, drum etc and is applicable whether or not the container is sealable.

Preferably each tying device identifies its respective container, the tying device being attachable to a neck of the container, or a container neck formed by folding of the container, the tying device having a preprinted container name thereon or positionable thereon.

Preferably the preprinted or positionable container name is located on an external surface of an enlarged portion of each tying device. Most preferably the container is a plastic bag.

Preferably the tying device of this aspect is a tying device of any one of the first to sixth aspects.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 7 shows a perspective view of a further embodiment of a tying device in accordance with the invention.

FIG. 8 shows a plan view of the embodiment shown in FIG. 7.

MODES FOR CARRYING OUT THE INVENTION

Figure 1:
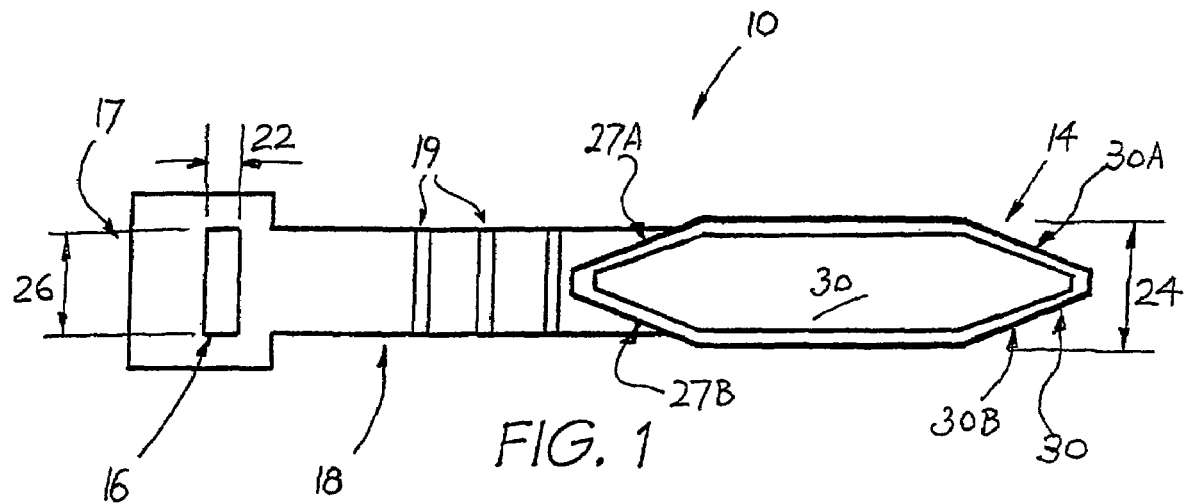
FIG. 1 shows a plan view of one embodiment of a tying device in accordance with the invention.
Figure 2:
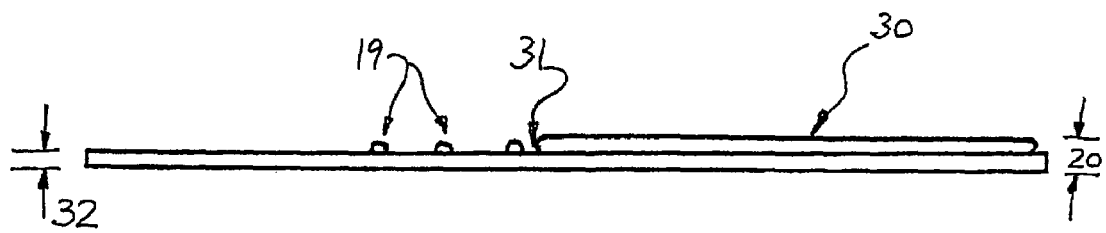
FIG. 2 shows a side elevation view of the embodiment shown in FIG. 1.
Figure 3:
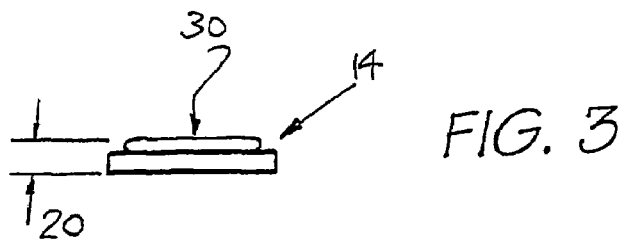
FIG. 3 shows an end elevation view of the embodiment shown in FIG. 1.

Referring to FIGS. 1 to 3, a tying device is shown in the form of an identification tag 10. The tag 10 is elongate and in use is wrapped around a cable and is releasably joined to itself to form a collar about the cable. As shown in the drawings the tag 10 has an enlarged portion shaped as a flattened octagon or diamond head 14 located at one end of a strap portion 18 of the tag 10.

In use the diamond head 14 is forcibly inserted through a hole 16 which is located in an enlarged, square-shaped opposing end portion 17 of the strap 18. The diamond head 14 has a thickness dimension 20 that is greater than the narrowest width dimension 22 of the hole 16 so that, after insertion into the hole 16, the thickness of the diamond head 14 causes that head to be retained in the hole 16. In use an end edge of the raised upper exterior surface 30 of the diamond head 14 forms a shoulder 31 which locates in seating abutment with the edges or rim of the hole 16.

In the preferred embodiment shown in FIGS. 1 to 3, the diamond head 14 also has a transverse width dimension 24 that is greater than the width 22 or the breadth dimension 26 of the rectangular shaped hole 16. Thus when the tag 10 is deployed and secured about a cable and the diamond head 14 has been inserted into the hole 16, in this preferred embodiment the shortest length edges of the hole 16 come into abutment with a further shoulder of the diamond head 14 in the form of two bevelled sides 27A, 27B. In further embodiments, the enlarged portion of the tag 10 (diamond head 14 in the preferred embodiment) need not be of a transverse width dimension greater than the width of the strap portion (18 in the preferred embodiment), and the head end of the tag can be simply retained in the hole by the seating abutment of a shoulder of the head (shoulder 31 in the preferred embodiment) with the edges or rim of the smaller sized hole in the tag. For example the head end of such a tag can be of a width equivalent to (or narrower than) the width of the strap portion.

In a further preferred embodiment shown in FIGS. 7 and 8, a tag 300 is shown featuring a round hole 316 located in end portion 317. In all other respects this tag 300 is similar to the tag shown in FIGS. 1 to 3, and like parts have been given like numbering for ease of reference. In this preferred embodiment the diamond head 14 does not have a thickness dimension which is greater than the narrowest width dimension of the hole 316, and it is the abutment of the sides 27A and 27B with the rim of the hole 316 which retains the head 14 at the hole 316, rather than shoulder 31.

When either tag 10, 300 is wrapped circumferentially about a cable to form a collar, the tag remains secured to itself, but can also be released so that the device can be re-used many times. To facilitate this, in the preferred embodiment the entire tag 10, 300 is made of a flexible plastic material to facilitate the expansion of the respective hole 16, 316 and/or the compression or folding of the diamond head 14 so that the diamond head 14 can pass through the hole 16, 316. In some embodiments only the enlarged head portion of the tag need be made of a flexible material to ensure that this head can be secured into and released from the hole, and vice versa where the material surrounding the hole is made more flexible relative to the tag head.

Figure 5:
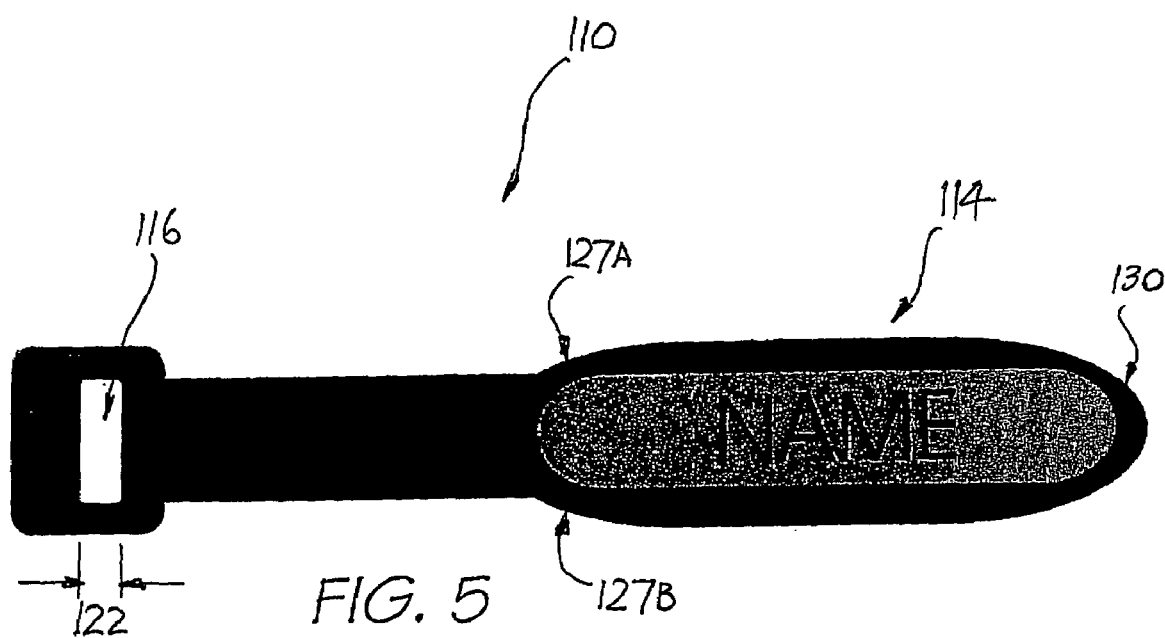
FIG. 5 shows a plan view of a further embodiment of a tying device in accordance with the invention.
Figure 6:
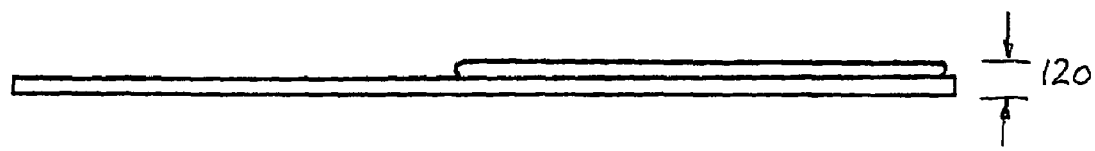
FIG. 6 shows a side elevation view of the embodiment shown in FIG. 5.

In a further preferred embodiment of a tag 110 shown in FIGS. 5 and 6, the enlarged portion or head of the tag 110 is shown in the form of an elongate oval head 114, which in use is forcibly inserted through a hole 116. In this embodiment, the oval head 114 has a thickness dimension 120 that is greater than the narrowest width dimension 122 of the hole 116 so that, after insertion into the hole 116, the thickness of the oval head 114 causes that head to be retained in the hole 116.

In this preferred embodiment, when the tag 110 is deployed and secured about a cable and the oval head 114 has been inserted into the hole 116, the edges of the hole 116 come into abutment with a rounded shoulder of the oval head 14 in the form of two rounded edges 127A, 127B. The outermost end 130 of the oval head 114 is roundly tapered to facilitate insertion of the oval head 114 into the hole 116. In the previous preferred embodiments shown in FIGS. 1 to 3, and in FIGS. 7 and 8, the outermost end 30 of the diamond head 14 is also tapered with two straight sides 30A and 30B to facilitate insertion of the diamond head 14 into the respective hole 16, 316.

Referring now to the preferred embodiments shown in FIGS. 1 to 3 and FIGS. 7 and 8, the diamond head 14 is at least in part of a thickness 20 greater than the thickness of a remainder of the tag 10, 300. The diamond head 14 thickness 20 is greater than the thickness 32 of the strap 18 or end portion 17, 317 of the tag 10, 300. Thus, the diamond head 14 is raised so as to have greater visual prominence which assists in identification of the tag when indicia are applied to an upper surface 30 of the diamond head 14. For example, indicia indicating a cable number, a type of electrical appliance, safety information or any other information can be pre-applied by ink printing onto the surface 30 of the diamond head 14 to assist in ease of identification of the cable. In some embodiments, braille can be applied to the enlarged portion of the tag to permit use of the tag by visually impaired persons, and the use of other indented or raised words coloured by a permanent ink is envisaged. In some embodiments the indicia can be applied by a marker pen or other marking device to a blank upper surface 30 once the cable tag 10 is applied. In still further embodiments the indicia can be supplied as a set of pre-made sticky labels which can be affixed to the head of the tag. These sticky labels can be formed on a transparent plastic film or a coloured film, and may be supplied with or without an appliance name printed thereon. In still further embodiments the raised upper surface 30 can even be formed of a different colour material, or glow in the dark material, to further enhance its visual appearance and to differentiate the tag from another tag.

Depending on the chosen length of the strap portion 18 of the tag 10, the tag 10 can provide tying for one or a large number of cables of various diameters, or even a single cable that is looped around itself for storage. The strap portion 18 can have a number of additional features to assist in fastening the head 14 portion at the end portion 17 and to facilitate gripping the tag 10, such as jagged etching or protruding ribs 19 located on the strap portion 18.

Figure 4:
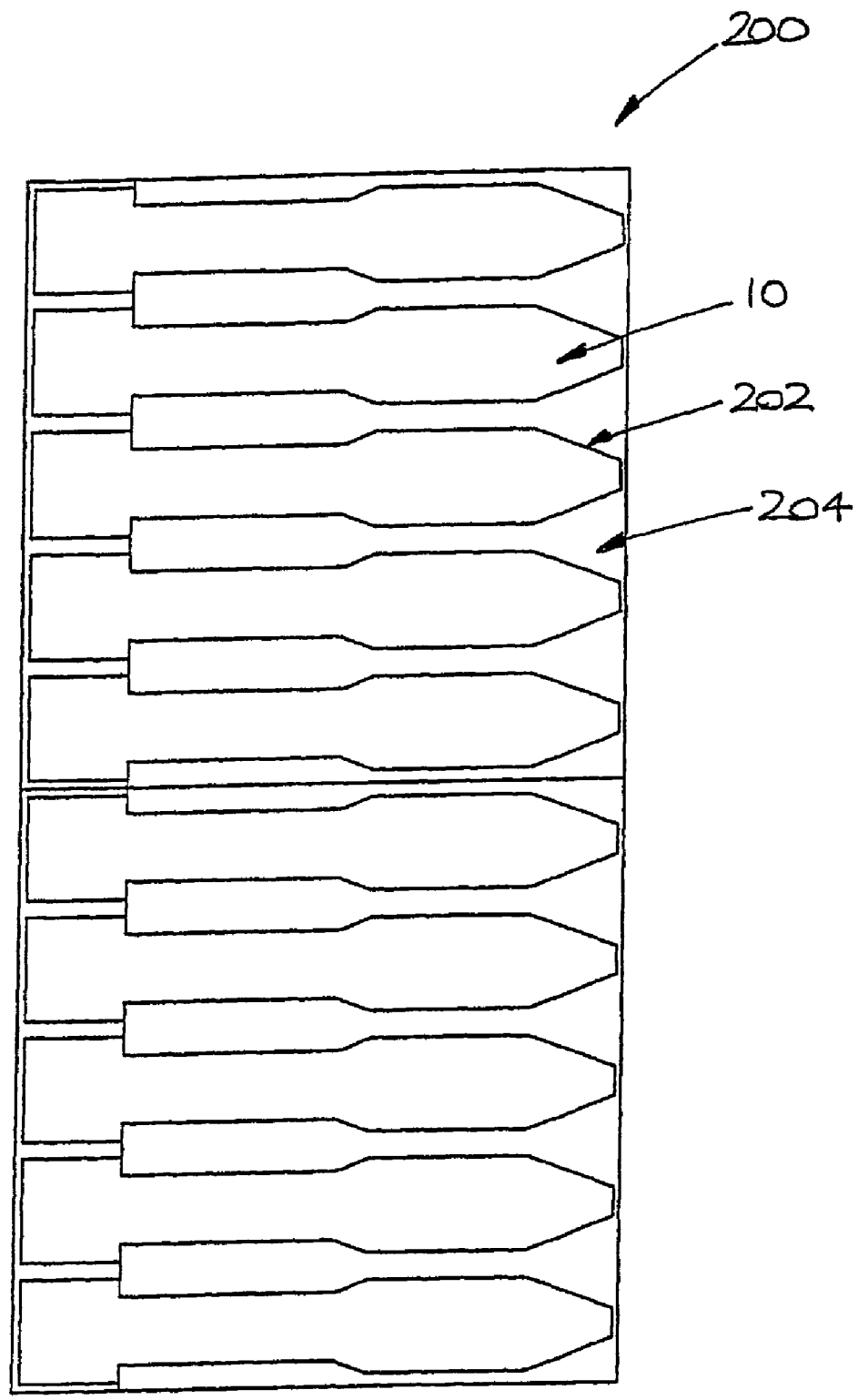
FIG. 4 shows a plan view of one embodiment of a card in accordance with the invention, the card including a plurality of detachable tying devices of the type shown in FIGS. 1 to 3.

A plurality of tags 10, 300 of the type shown in the Figures can be formed as part of a single card for ease of manufacture and supply to a user. A preferred embodiment shown in FIG. 4. Tags 10, 300 are detached from the card 200 immediately prior to use. Each tag 10, 300 is frangibly joined to the card 200 for detachment therefrom and each tag 10, 300 is made of the same material as the card. The outline of each tag 10, 300 is stamped or pressed into the card 200 during its manufacture. A user can dispense a tag 10, 300 from the card as a need arises by simply breaking the frangible joint 202 between the tags 10, 300 and card 200 and levering each tag 10, 300 away from the body of the card 200. In the preferred embodiment a card rim portion 204 of the card 200 remains once the tags 10, 300 are detached.

In further preferred embodiments of the invention, the tags formed in a card need not be identical but can have different shape and size dimensions determined by the stamping tool used. In still further embodiments the tags can be formed of a different material to the remainder of the card and detachably joined thereto.

FIG. 5 shows a preferred embodiment of the invention where the tags 110 have preprinted appliance name on the raised oval head 114. These appliance names can be inked on, embossed (or recessed) into the thicker oval head 114 portion, or stencilled or printed thereonto, or placed by means of a sticky label thereonto. It is envisaged that the tags 10, 110, 300 will be made available as part of a card (for example in the card 200 shown in FIG. 4) and will be available in sets suitable for a workshop, a home and an office, for example. For use in a workshop, typical appliance names for preprinting, forming or sticking onto tags can include drill, fan, lathe, cutter, welder etc. For use in a home, typical appliance names can include alarm clock, television, kettle, toaster, heater, fan, iron, microwave etc. In an office, typical appliance names can include fax machine, computer, printer, scanner, powerboard, photocopier, data cable, audio-visual cable etc. Other applications are also envisaged (eg, in hospitals and medical centres; in a computer manufacturing operation where individual cables within a computer panel require labelling; in beverage dispensing lines in hotel facilities).

The tags 14 can be arranged on the card 200 with the appliance names arranged in a readable array (ie. oriented in a single direction), which facilitates ease of use without having to constantly turn the card around looking for a particular tag. In other embodiments cards can be manufactured wherein consecutive tags are arranged end to end and thus the appliance names on consecutive tags are reversed.

Such a system for identifying a cable of an electrical appliance by tagging can allow a user to readily identify the appliance to which the cable is connected, or to identify the cable itself, in situations where a plurality of cables may be located in close proximity to one another. In some situations when the wrong cable is about to be unplugged, the invention can provide a check step for a user, which can be important to maintain productivity, reduce frustration and for matters of safety.

In further embodiments within the scope of the invention, the tags can be applied to the identification of portable devices such as ropes, hoses, cords, key tags, collapsible containers such as plastic bags, rigid containers such as gas cylinders or drums, (and applicable whether or not the container is sealable), vehicles, automotive machinery etc, or to fixed apparatus such as pipes, tanks, handrails and the like.

The tags can provide a ready way of differentiating the contents of bags or other containers or pieces of machinery, spare parts etc. Even if the tags are supplied without name labelling, they can provide differentiation between goods by their surface colour coding or the colour coding of a sticky label applied to the tag, and the names of the goods held in the container or the name of the appliance to which the cable is attached can subsequently be applied by a user onto the tag with a marker pen or the like.

In further embodiments of the invention, the enlarged portion need not be located at one end of an elongate tag but can be positioned somewhere along the length of the tag. In still further embodiments the hole need not be located at an end of an elongate tag either, but can be positioned at any position along the length of the tag. It should also be observed that there is also no particular requirement for the tag have as narrow and elongate proportions as shown in the Figures, and in other embodiments the tag can be broader in transverse width to more sturdily surround a bundle of cables, for example.

Typically the tag is made of a polymer, flexible plastic, synthetic or natural rubber and the like so as to be flexibly moved around a loop or a bundle of cables which still being sufficiently strong so as to be able to support the weight of the bound cables if the tag is suspended, for example. One particularly suitable material is known as Thermolast K, which has a Shore Hardness of 60, although similar materials with a Shore Hardness in the range 30-90 would be suitable. Typically the tag is formed by injection moulding.

Whilst the invention has been described with reference to preferred embodiment it should be appreciated that the invention can be embodied in many other forms.

It is to be understood that, if any prior art information is referred to herein, such reference does not constitute an admission that the information forms a part of the common general knowledge in the art, in Australia or any other country.

The invention claimed is:

1. A system for differentiating two or more cables of two or more respective appliances, the system comprising a respective tying device for tying to a respective cable;

wherein each tying device comprises:

an elongate member for releasable securement at a cable by wrapping around the cable;

a planar enlarged portion arranged on the member for insertion through a hole located in the member, the hole having a periphery being entirely surrounded by a material of the member, the enlarged portion including a raised portion thereon to provide that part of the enlarged portion with a thickness greater than a remainder of the enlarged portion;

wherein the device being configured such that the enlarged portion can be passed from one side of the member, completely through the hole, to an opposite side of the member to be secured at the opposite side; and wherein the elongate member has the same thickness as the remainder of the planar enlarged portion.

2. A system as claimed in claim 1 wherein indicia are pre-applied to an external surface of the raised portion.

3. A system as claimed in claim 1 wherein the enlarged portion of the device at least is made of a flexible material.

4. A card comprising:

a border frame section; and a plurality of detachable elongate members, each of the members being frangibly joined to the border frame section for detachment therefrom, an enlarged portion being defined in at least one of the members for insertion in use through a hole located in the member, the hole having a periphery being entirely surrounded by a material of the member, the enlarged portion being a planar enlarged portion arranged on the member for insertion through the hole located in, the enlarged portion including a raised portion thereon to provide that part of the enlarged portion with a thickness greater than a remainder of the enlarged portion; wherein the enlarged portion of the member has a transverse width greater than a corresponding transverse width of the hole.

5. A card as claimed in claim 4 to wherein the members are each made of the same material as the border frame section.

* * * * *